Patented Nov. 4, 1947

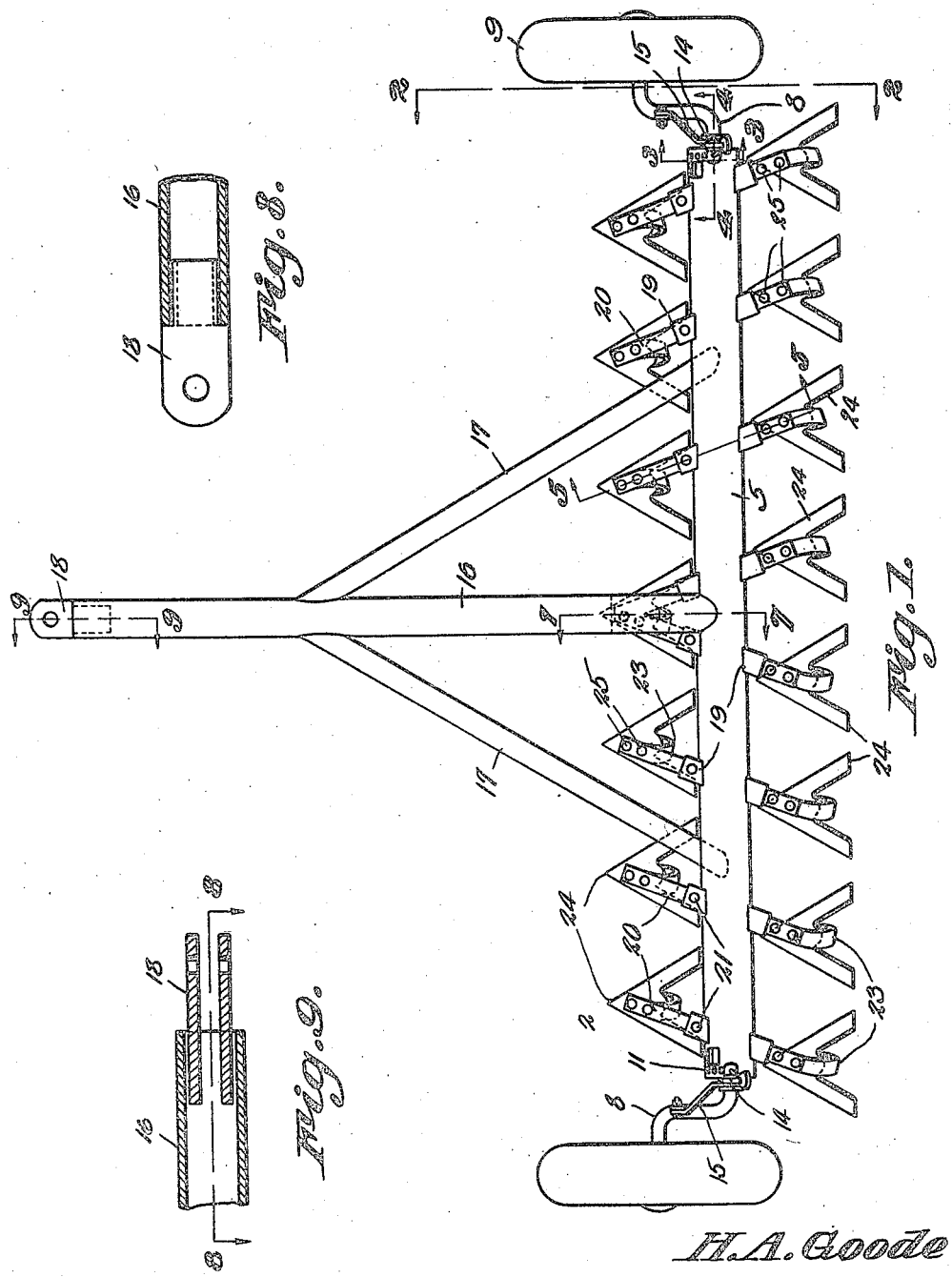

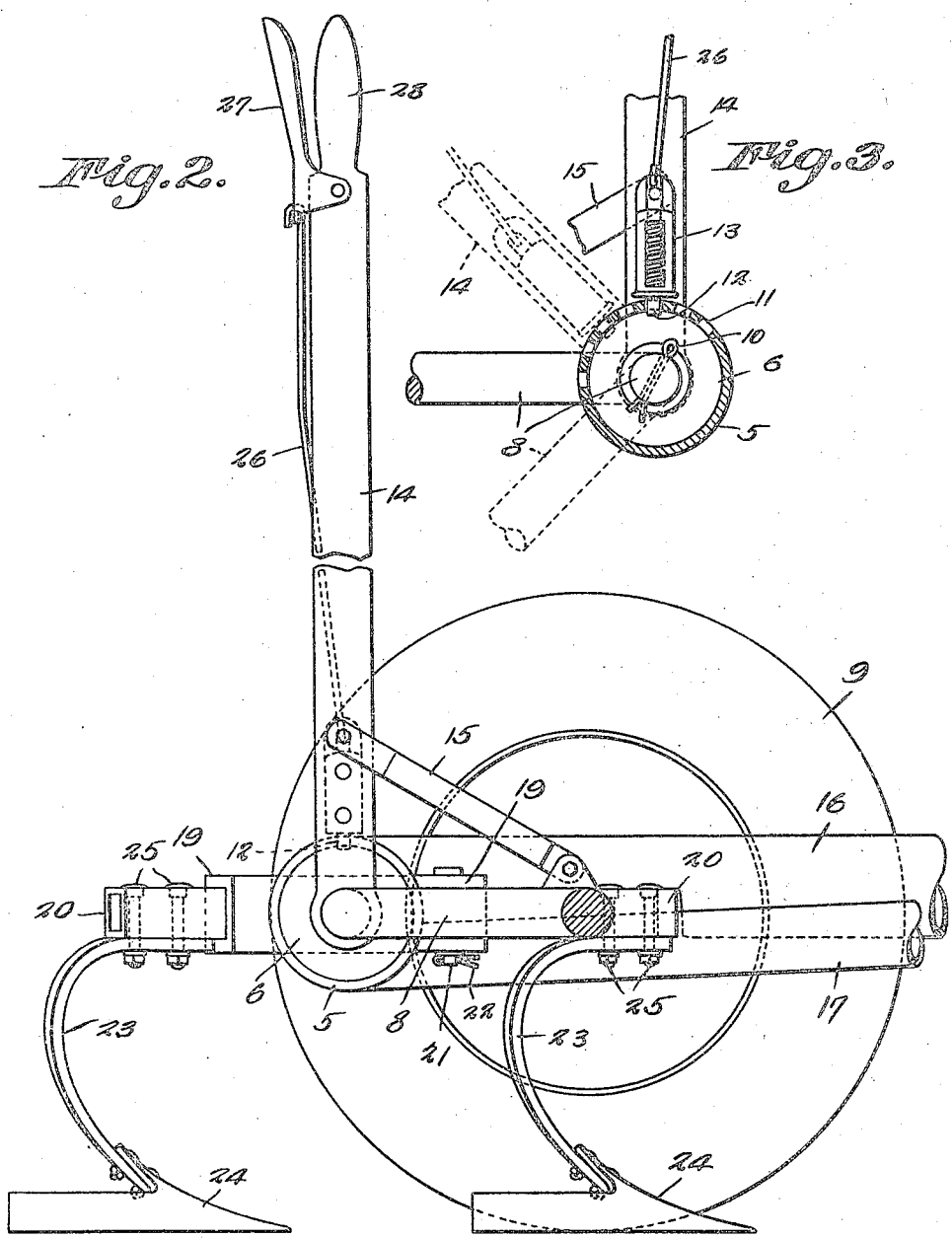

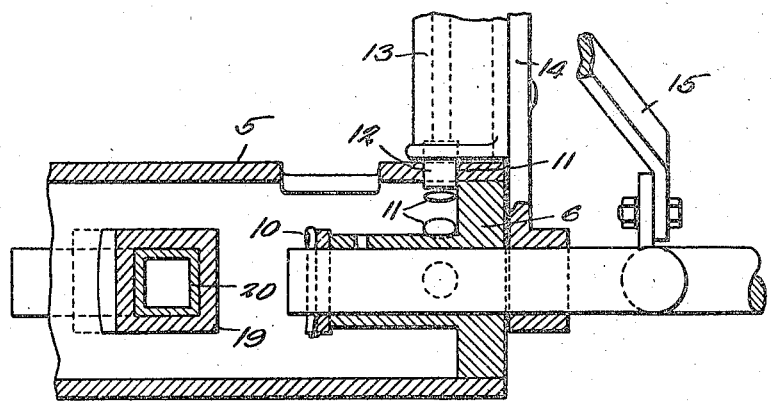
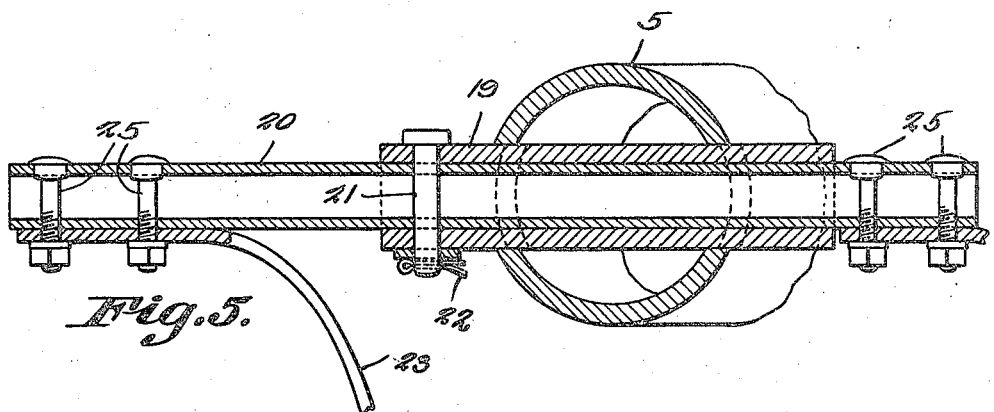
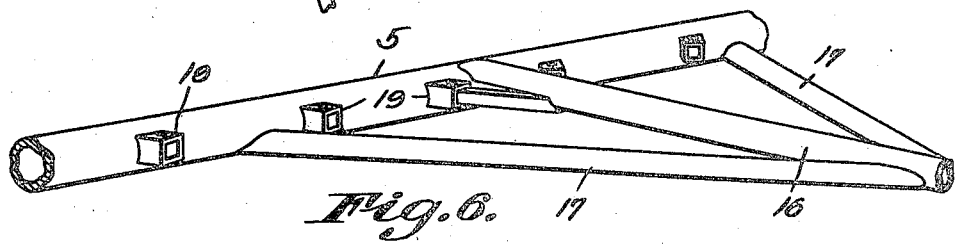
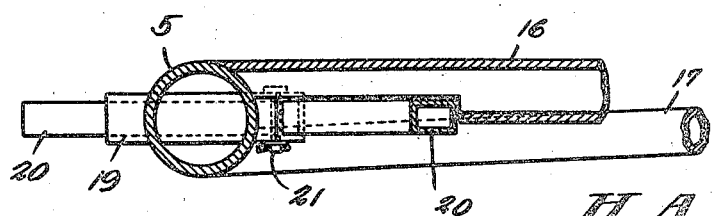

2,430,223

UNITED STATES PATENT OFFICE 2,430,223

CULTIVATOR

Henry A. Goode, Booker, Tex., assignor of one-half to Corwin Trosper, Booker, Tex.

Application January 2, 1946, Serial No. 638,657

3 Claims. (Cl. 97—162)

This invention relates to farm machinery, and more particularly to cultivators or plows designed for use in cutting vegetation at a point below the ground surface, thereby killing the vegetation without turning the vegetation under and exposing the earth to the elements.

An important object of the invention is to construct the framework of the cultivator or plow of tubular or material round in cross-section, thereby presenting curved surfaces so that the weeds and vegetation will be guided away from the frame of the cultivator or plow and will not collect on the frame to render cultivating or plowing difficult.

Still another object of the invention is to provide means whereby the cultivator or plow frame may be readily and easily adjusted vertically, regulating the depth of operation of the plow blades carried by the frame of the machine.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings

Figure 1 is a plan view of a plow constructed in accordance with the invention.

Figure 2 is an enlarged sectional view taken on line 2—2 of Fig. 1.

Figure 3 is an enlarged sectional view taken on line 3—3 of Fig. 1.

Figure 4 is an enlarged sectional view taken on line 4—4 of Fig. 1.

Figure 5 is an enlarged sectional view taken on line 5—5 of Fig. 1.

Figure 6 is a fragmental perspective view illustrating the main rear bar and tongue of the machine.

Figure 7 is an enlarged sectional view taken on line 7—7, Fig. 1.

Figure 8 is an enlarged sectional view taken on line 8—8, Fig. 9.

Figure 9 is an enlarged sectional view taken on line 9—9, Fig. 1.

Referring to the drawings in detail, the reference character 5 indicates the main bar of the frame, which is tubular in formation, as clearly shown by the drawings. The ends of the bar 5 are closed by means of the disks 6 which have inwardly extended tubular bearings 7 formed integral therewith, in which the axles 8 are mounted, the axles being in the form of cranks, the outer ends of which provide supports for the wheels 9.

The axles 8 are rotatably held within their bearings 7 by means of the cotter keys 10 that pass through openings in the inner ends of the axles 8.

Formed in the bar 5 at points adjacent to the ends thereof, are openings 11 that are adapted to accommodate the pins 12 that are spring-pressed and normally urged into openings 11 to hold the axles in various positions of adjustment.

The pins 12 are mounted for reciprocation in the housings 13 which are secured to the lower end of the levers 14 which are also mounted on the axles. A link 15 connects each lever 14 with its axle at a point whereby movement of the lever 14 will result in the axle rocking to adjust the frame of the plow vertically.

The reference character 16 indicates the tongue or hitch bar which is also preferably tubular in formation, the inner end of the hitch bar being welded to the bar 5, at a point intermediate the ends thereof. Brace bars 17 are welded at their forward ends, to the hitch bar 16, while the rear ends thereof are welded to the bar 5, at points spaced from the ends of the bar 5, thereby securely bracing the main bar and hitch bar, with respect to each other.

At the outer end of the hitch bar is a connecting member 18 which is formed with an opening through which a suitable pin may be dropped, in securing the plow to a tractor or similar power machine.

As clearly shown by Fig. 5 of the drawings, the main bar 5 is provided with bores or openings, which are formed in the front and rear surfaces, the bores being disposed at acute angles with respect to the bar 5. As shown by Fig. 1 of the drawings, the bores at one side of the tongue or hitch bar 16 are disposed in a direction opposite to the bores at the opposite side thereof. These bores receive the tubular members 19 which are welded to the bar 5, the ends of the tubular members extending beyond the surface of the bar 5. These tubular members 19 provide bearings for the tubular plow supporting bars 20 which are of lengths to extend beyond the ends of the tubular members 19, the tubular members 19 and bars 20 being formed with registering openings to accommodate the removable pins 21 which are secured within the registering openings, by means of the cotter keys 22. Thus it will be seen that due to this construction, the tubular bars 20 may be removed readily, should it be desired to repair or replace parts of the mechanism.

The tubular bars 20 provide supports for the spring arms 23 that carry the plow blades 24 which are of the type to cut directly under the surface of the soil to kill the vegetation without plowing under the vegetation to expose the soil. Registering openings are formed in the bars 20 and spring arms 23, to accommodate the removable bolts 25, which construction permits of removal of the spring arms 23 and plow blades carried thereby.

It might be further stated that the pin 12 is actuated by means of a rod 26 that connects therewith, the opposite end of the rod being connected with the lever 27 that is pivotally connected with the lever 14, at a point adjacent to the handle 28 thereof, so that when the handle is gripped, the pin 12 will be retracted from an opening of the bar 5. Upon further movement of the lever 14, the axle 8 will be moved to adjust the frame of the plow vertically, regulating the depth of operation of the plow blades.

Further, it will be seen that due to the construction shown and described, I have provided a cultivator or plow embodying a frame constructed of bars of such a construction that weeds, grass and other foreign matter will not collect thereon, as the cultivator or plow is being moved through the ground surface. The bars of which the frame is constructed, being curved, causes the foreign matter to slide thereover.

It will also be seen that the plow blades forming the front or forward row of plows, are offset with respect to the plows forming the rear row to the end that plows of the rear row operate in lines directly to the rear of the adjacent rear edges of the plows of the forward row. It will also be seen that certain plows of the front row of plows are secured to the front ends of the bars which support the plows of the rear row of plows, providing a structure which is exceptionally simple and practical for making the necessary adjustments.

What is claimed is:

1. A multiple row plow organization, comprising a frame embodying a tubular wheel-supported main bar having registering pairs of openings formed in the front and rear surfaces thereof, tubular members secured within the pairs of registering openings, tubular bars removably held within the tubular members, the ends of the tubular bars extending beyond the ends of the tubular members and plows secured to the tubular bars adjacent to the ends thereof.

2. A multiple row plow organization, comprising a frame embodying a tubular wheel-supported main bar having registering pairs of openings formed in the front and rear surfaces thereof, said openings being formed with their walls disposed at acute angles with respect to the surface of the main bar, tubular members secured within the pairs of registering openings, tubular bars removably secured within the tubular members, the ends of the tubular bars extending beyond the ends of the tubular members, said tubular bars and tubular members being disposed at acute angles with respect to the front and rear surfaces of the main bar, and plows secured to the tubular members adjacent to the ends thereof.

3. A multiple row plow organization comprising a frame embodying a tubular wheel-supported main bar having registering pairs of openings formed in the front and rear surfaces thereof, tubular members secured within the pairs of registering openings, tubular bars removably secured within the tubular members, means for removably securing the tubular bars within the tubular members, said means embodying a pin extended through registering openings in the tubular members and bars, spring arms connected to the tubular bars, and plows secured to the spring arms, the plows at the rear ends of the tubular bars being offset with respect to the plows secured to the front ends of the tubular bars.

HENRY A. GOODE.

REFERENCES CITED

The following references are of record in the file of this patent:

UNITED STATES PATENTS

| Number | Name | Date |
| --- | --- | --- |
| 1,788,360 | Sheard | Jan. 6, 1931 |
| 2,041,616 | Noell et al. | May 19, 1936 |